US012561048B2

(12) United States Patent
Wan et al.

(10) Patent No.: US 12,561,048 B2
(45) Date of Patent: Feb. 24, 2026

(54) METHOD, FORM DATA PROCESSING METHOD, APPARATUS, AND ELECTRONIC DEVICE FOR FORM GENERATION

(71) Applicant: Beijing Zitiao Network Technology Co., Ltd., Beijing (CN)

(72) Inventors: Shiqi Wan, Beijing (CN); Yuhan Chen, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/392,934

(22) Filed: Dec. 21, 2023

(65) Prior Publication Data

US 2024/0126417 A1 Apr. 18, 2024

Related U.S. Application Data

(63) Continuation of application No. PCT/CN2022/125384, filed on Oct. 14, 2022.

(30) Foreign Application Priority Data

Oct. 21, 2021 (CN) .......................... 202111230327.4

(51) Int. Cl.
G06F 3/048 (2013.01)
G06F 3/04842 (2022.01)
(Continued)

(52) U.S. Cl.
CPC ...... *G06F 3/04842* (2013.01); *G06F 3/04845* (2013.01); *G06F 3/0485* (2013.01)

(58) Field of Classification Search
None
See application file for complete search history.

(56) References Cited

U.S. PATENT DOCUMENTS 8,095,877 B1 * 1/2012 Szonn ................... G06F 40/106
715/274
9,665,249 B1 * 5/2017 Ding ....................... G06F 3/013
(Continued)

FOREIGN PATENT DOCUMENTS

CN 108959361 A 12/2018
CN 109582733 A 4/2019
(Continued)

OTHER PUBLICATIONS

International Search Report (with English translation) and Written Opinion issued in PCT/CN2022/125384, dated Jan. 12, 2023, 9 pages provided.
(Continued)

*Primary Examiner* — Hua Lu
(74) *Attorney, Agent, or Firm* — Astute IP Law Group

(57) ABSTRACT

The embodiments of the disclosure disclose a method for form generation, method for form data processing and apparatus, and electronic device. The method for form generation includes: in response to receiving a generation instruction for a second form in a display page of a first form, displaying an initial second form and a field selection item, a second field indicated by the field selection item being associated with a first field in the first form; and determining a target second field based on a selection operation on the field selection item and generating a second form based on the target second field.

16 Claims, 6 Drawing Sheets

(51) Int. Cl.
  *G06F 3/04845* (2022.01)
  *G06F 3/0485* (2022.01)

(56) References Cited

U.S. PATENT DOCUMENTS

| | | | | |
|---|---|---|---|---|
| 9,690,755 | B2 * | 6/2017 | Craven | G06F 40/166 |
| 10,417,706 | B1 * | 9/2019 | Simon | G06Q 30/0643 |
| 10,482,150 | B1 * | 11/2019 | Denzer | G06F 3/0484 |
| 10,699,231 | B1 * | 6/2020 | Ressler | G06Q 10/103 |
| 10,733,364 | B1 * | 8/2020 | Allison | H04L 67/1097 |
| 11,204,690 | B1 * | 12/2021 | Hoberman | G06F 3/04842 |
| 11,757,990 | B2 * | 9/2023 | Ignatyev | G06F 16/27 |
| | | | | 705/26.7 |
| 11,792,257 | B2 * | 10/2023 | Broddle | G06F 40/186 |
| | | | | 715/221 |
| 2005/0234850 | A1 * | 10/2005 | Buchheit | H04L 51/216 |
| 2005/0268217 | A1 * | 12/2005 | Garrison | G06F 40/174 |
| | | | | 707/999.001 |
| 2007/0245227 | A1 * | 10/2007 | Hyland | G06Q 10/10 |
| | | | | 705/1.1 |
| 2008/0082909 | A1 * | 4/2008 | Zuverink | G06F 40/174 |
| | | | | 715/224 |
| 2010/0153834 | A1 * | 6/2010 | Abe | G06F 40/174 |
| | | | | 715/222 |
| 2010/0161644 | A1 * | 6/2010 | Crim | G06F 16/2453 |
| | | | | 707/E17.014 |
| 2010/0174974 | A1 * | 7/2010 | Brisebois | G06Q 10/00 |
| | | | | 715/780 |
| 2010/0251092 | A1 * | 9/2010 | Sun | G06F 40/174 |
| | | | | 715/221 |
| 2011/0320925 | A1 * | 12/2011 | Piersol | G06F 40/174 |
| | | | | 715/231 |
| 2013/0061124 | A1 * | 3/2013 | Patton | G06F 40/174 |
| | | | | 715/224 |
| 2013/0198628 | A1 * | 8/2013 | Ethier | G06F 9/453 |
| | | | | 715/709 |
| 2013/0205189 | A1 * | 8/2013 | DiPierro | G06F 3/0483 |
| | | | | 715/224 |
| 2013/0339398 | A1 * | 12/2013 | Griggs | G06F 16/211 |
| | | | | 707/E17.044 |
| 2014/0245120 | A1 * | 8/2014 | Schwartz | G06V 30/32 |
| | | | | 715/226 |
| 2014/0372860 | A1 * | 12/2014 | Craven | G06F 40/103 |
| | | | | 715/222 |
| 2014/0380229 | A1 * | 12/2014 | Volodin | G06F 3/04842 |
| | | | | 715/780 |
| 2015/0378573 | A1 * | 12/2015 | Jansen op de Haar | |
| | | | | G06Q 10/06 |
| | | | | 715/747 |
| 2018/0121066 | A1 * | 5/2018 | Kato | G06F 3/04883 |
| 2018/0225266 | A1 * | 8/2018 | White | G06F 16/95 |
| 2018/0225273 | A1 * | 8/2018 | White | G06F 3/0486 |
| 2018/0232216 | A1 * | 8/2018 | White | G06F 8/34 |
| 2019/0088237 | A1 * | 3/2019 | DePietro, III | G06F 3/04845 |
| 2020/0110792 | A1 * | 4/2020 | Tsabba | G06F 3/167 |
| 2020/0142862 | A1 * | 5/2020 | Lopez Ruiz | G06F 16/1865 |
| 2020/0341619 | A1 * | 10/2020 | Rogers | G06F 8/71 |
| 2021/0089618 | A1 * | 3/2021 | Jain | G06Q 10/1097 |
| 2021/0294967 | A1 * | 9/2021 | Goodsitt | G06F 21/6245 |
| 2021/0304882 | A1 * | 9/2021 | Gauthier | G16H 15/00 |
| 2021/0390251 | A1 * | 12/2021 | Swvigaradoss | G06F 40/174 |
| 2022/0012406 | A1 * | 1/2022 | D'Oria | G06V 30/10 |
| 2022/0261498 | A1 * | 8/2022 | Ricchuiti | H04W 12/02 |
| 2023/0004288 | A1 * | 1/2023 | Kang | G06F 3/04886 |
| 2023/0237255 | A1 * | 7/2023 | Xiong | G06F 3/0482 |
| | | | | 704/9 |

FOREIGN PATENT DOCUMENTS

| | | |
|---|---|---|
| CN | 109829146 A | 5/2019 |
| CN | 114047986 A | 2/2022 |

OTHER PUBLICATIONS

Office Action issued in Chinese Application No. 202111230327.4, dated Feb. 4, 2023, with machine translation.

* cited by examiner

231

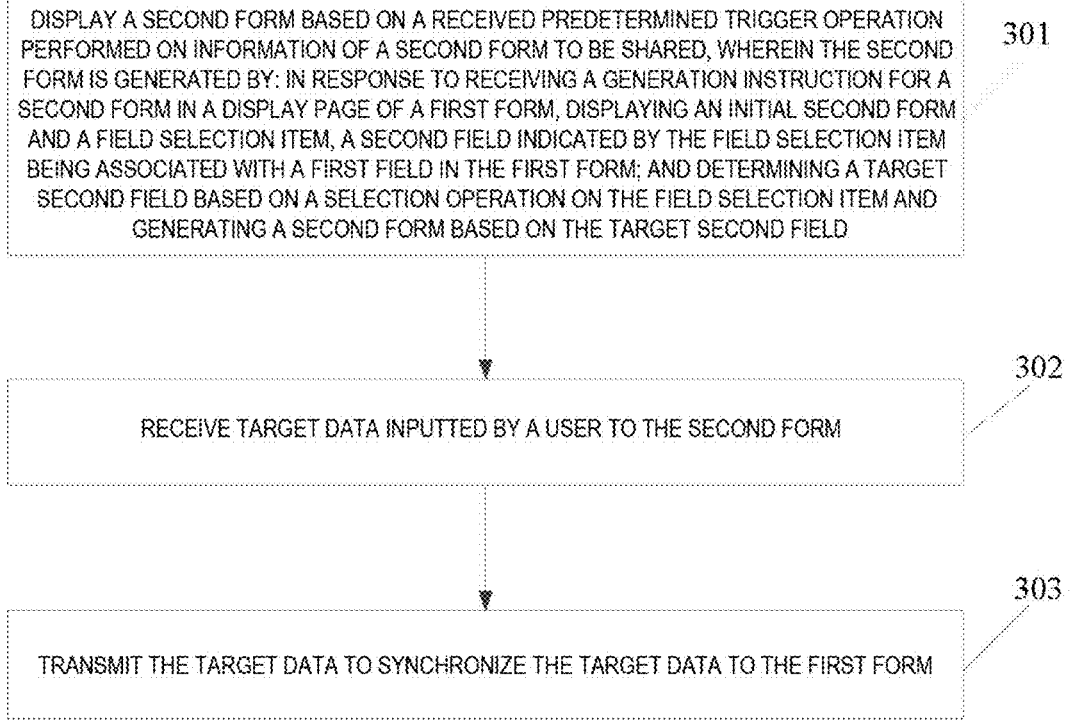

DISPLAY A SECOND FORM BASED ON A RECEIVED PREDETERMINED TRIGGER OPERATION PERFORMED ON INFORMATION OF A SECOND FORM TO BE SHARED, WHEREIN THE SECOND FORM IS GENERATED BY: IN RESPONSE TO RECEIVING A GENERATION INSTRUCTION FOR A SECOND FORM IN A DISPLAY PAGE OF A FIRST FORM, DISPLAYING AN INITIAL SECOND FORM AND A FIELD SELECTION ITEM, A SECOND FIELD INDICATED BY THE FIELD SELECTION ITEM BEING ASSOCIATED WITH A FIRST FIELD IN THE FIRST FORM; AND DETERMINING A TARGET SECOND FIELD BASED ON A SELECTION OPERATION ON THE FIELD SELECTION ITEM AND GENERATING A SECOND FORM BASED ON THE TARGET SECOND FIELD    301

RECEIVE TARGET DATA INPUTTED BY A USER TO THE SECOND FORM    302

TRANSMIT THE TARGET DATA TO SYNCHRONIZE THE TARGET DATA TO THE FIRST FORM    303

FIG. 3

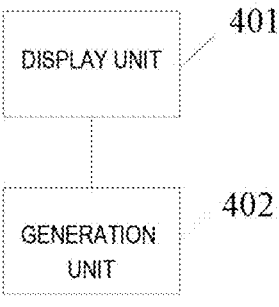

DISPLAY UNIT    401

GENERATION UNIT    402

FIG. 4

METHOD, FORM DATA PROCESSING METHOD, APPARATUS, AND ELECTRONIC DEVICE FOR FORM GENERATION

CROSS REFERENCE

This application is a continuation of International Patent Application No. PCT/CN2022/125384, filed on Oct. 14, 2022, which claims priority to the Chinese Patent Application No. 202111230327.4, filed on Oct. 21, 2021, and entitled "METHOD, FORM DATA PROCESSING METHOD, APPARATUS, AND ELECTRONIC DEVICE FOR FORM GENERATION", the entirety of which is incorporated herein by reference.

FIELD

The present disclosure relates to the field of Internet technology, and in particular to a method, form data processing method, apparatus, and electronic device for form generation.

BACKGROUND

With the development of internet technology, a questionnaire page can be sent to a user online, the user can fill data in the questionnaire page. The data filled in the questionnaire can be uploaded to the server and then manually input into the database.

SUMMARY

This Summary is provided to introduce concepts in a simplified form that are further described below in the Detailed Description. This Summary is not intended to identify key features or essential features of the technical solution as defined, nor is it intended to be used to limit the scope thereof.

The present disclosure provides a method for form generation, method for form data processing, device, and electronic device.

In a first aspect, embodiments of the present disclosure provide a method for form generation. The method comprises: in response to receiving a generation instruction for a second form in a display page of a first form, displaying an initial second form and a field selection item, a second field indicated by the field selection item being associated with a first field in the first form; and determining a target second field based on a selection operation on the field selection item and generating a second form based on the target second field.

In a second aspect, the embodiments of the present disclosure provide a method for form data processing. The method comprises: displaying a second form based on a received predetermined trigger operation performed on information of a second form to be shared, wherein the second form is generated by: in response to receiving a generation instruction for a second form in a display page of a first form, displaying an initial second form and a field selection item, a second field indicated by the field selection item being associated with a first field in the first form; and determining a target second field based on a selection operation on the field selection item and generating a second form based on the target second field; receiving target data inputted by a user to the second form; and transmitting the target data to synchronize the target data to the first form.

In a third aspect, the embodiments of the present disclosure provide an apparatus for form generating. The apparatus comprises: a display unit configured to in response to receiving a generation instruction for a second form in a display page of a first form, display an initial second form and a field selection item, a second field indicated by the field selection item being associated with a first field in the first form; a generation unit configured to determine a target second field based on a selection operation on the field selection item and generate a second form based on the target second field.

In a fourth aspect, the embodiments of the present disclosure provide an apparatus for form data processing. The apparatus comprises: a presentation unit configured to display a second form based on a received predetermined trigger operation performed on information of a second form to be shared, wherein the second form is generated by: in response to receiving a generation instruction for a second form in a display page of a first form, displaying an initial second form and a field selection item, a second field indicated by the field selection item being associated with a first field in the first form; and determining a target second field based on a selection operation on the field selection item and generating a second form based on the target second field; a receiving unit configured to receive target data inputted by a user to the second form; a transmitting unit configured to transmit the target data to synchronize the target data to the first form.

In a fifth aspect, the embodiments of the present disclosure provide an electronic device comprising: one or more processors, a memory device for storing one or more programs which, when executed by the one or more processors, cause the one or more processors to implement the method for form generation as described in the first aspect or the method for form data processing as described in the second aspect.

In a sixth aspect, the embodiments of the present disclosure provide a computer readable storage medium on which a computer program is stored, the computer, when executed by a processor, performing the steps of the method for form generation as described in the first aspect or the method for form data processing as described in the second aspect.

With the method for form generation, apparatus and electronic device provided by the embodiments of the present disclosure, in response to receiving a generation instruction for a second form in a display page of a first form, displaying an initial second form and a field selection item, a second field indicated by the field selection item being associated with a first field in the first form; and determining a target second field based on a selection operation on the field selection item and generating a second form based on the target second field.

BRIEF DESCRIPTION OF THE DRAWINGS

Through the more detailed description of detailed implementations with reference to the accompanying drawings, the above and other features, advantages and aspects of respective embodiments of the present disclosure will become more apparent. The same or similar reference numerals represent the same or similar elements throughout the figures. It should be understood that the figures are merely schematic, and components and elements are not necessarily drawn to scale.

FIG. 3 is a flowchart of an embodiment of a method for form data processing according to the present disclosure.

FIG. 4 is a schematic structural diagram of an embodiment of an apparatus for form generation according to the present disclosure.

DETAILED DESCRIPTION

The embodiments of the present disclosure will be described in more detail with reference to the accompanying drawings, in which some embodiments of the present disclosure have been illustrated. However, it should be understood that the present disclosure can be implemented in various manners, and thus should not be construed to be limited to embodiments disclosed herein. On the contrary, those embodiments are provided for the thorough and complete understanding of the present disclosure. It should be understood that the drawings and embodiments of the present disclosure are only used for illustration, rather than limiting the protection scope of the present disclosure.

It should be understood that various steps described in method implementations of the present disclosure may be performed in different order and/or in parallel. Furthermore, method implementations may include additional steps and/or omit steps that are shown. The scope of the present disclosure is not limited in this regard.

The terms "comprise" and its variants used herein are to be read as open terms that mean "include, but is not limited to." The term "based on" is to be read as "based at least in part on." The term "one embodiment" is to be read as "at least one embodiment," the term "another embodiment" is to be read as "at least one another embodiment," and the term "some embodiments" is to be read as "at least some embodiments." Other definitions, explicit and implicit, might be included below.

It should be noted that concepts "first," "second" and the like mentioned in the present disclosure are only used to distinguish between different apparatuses, modules or units, rather than limiting the order or interdependence of the functions performed by these apparatuses, modules or units.

It should be noted that modifications "one" and "more" mentioned in the present disclosure are schematic and not limiting, and should be understood as "one or more" to those skilled in the art unless otherwise specified.

Names of messages or information exchanged between the plurality of apparatuses in implementations of the present disclosure are used for illustrative purposes only and are not intended to limit the scope of those messages or information.

In related technologies, the data in the questionnaire needs to be extracted, processed and entered into a database manually, thus the cost of questionnaire data collection is high.

In order to solve the above problem, the present application provides the following solution.

Figure 1:
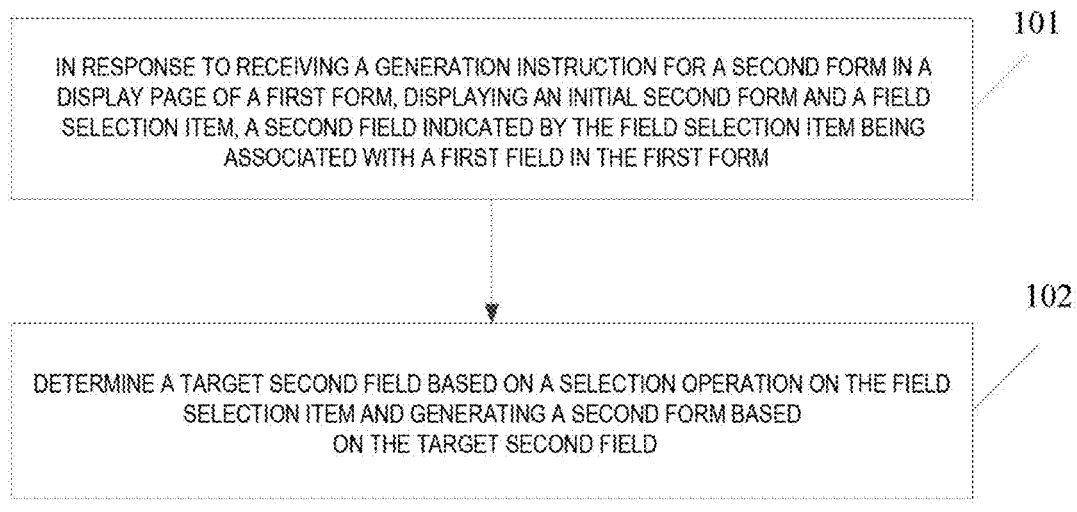
FIG. 1 is a flowchart of an embodiment of the method for form generation according to the present disclosure.

Reference is made to FIG. 1, which illustrates a flow of an embodiment of a method for form generation according to the present disclosure. As shown in FIG. 1, the method for form generation includes by as:

Step 101, in response to receiving a generation instruction for a second form in a display page of a first form, displaying an initial second form and a field selection item, a second field indicated by the field selection item being associated with a first field in the first form.

Step 102, determining a target second field based on a selection operation on the field selection item and generating a second form based on the target second field.

The first form herein can be a multidimensional data table.

A multidimensional data table can be regarded as a database. A multidimensional data table can include a plurality of data tables, and a data table can have a plurality of views.

The above second form generation instruction can be issued in various ways. For example, the second form generation instruction can be issued by issuing an interactive entry. The above interactive entry may include a form generation selection item in the above display page.

The above receiving a generation instruction for a second form in a display page of a first form comprises: receiving a predetermined operation performed on a form generation option displayed in the display page of the first form.

Figures 2A, 2B:
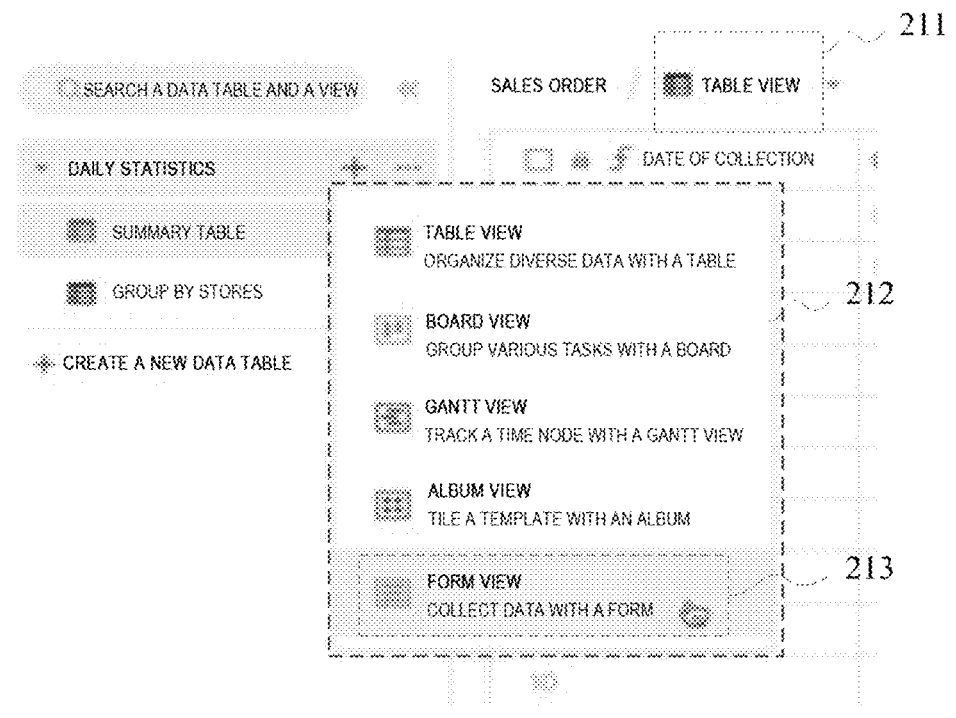
FIG. 2A is a schematic scene generated by a second form generation instruction.
FIG. 2B is another schematic scene generated by a second form generation instruction.

In some application scenarios, the form generation option comprises: displaying a first form generation option in a view generation tool in the display page. The display page of the first form may be a page that displays the first form information. In some application scenarios, reference is made to FIG. 2A, which shows a schematic scenario generated by the second form generation instruction. As shown in FIG. 2A, the view generation tool setting item 211 may be included in the above display page of the first form. After triggering the view generation tool setting item 211, the view generation tool 212 may be displayed, including but not limited to: table view, note card view, Gantt view, or album view. In addition, the first form generation option 213 may be included in the above view generation tool. The user can issue instructions to generate the second form by triggering the first form generation option 213.

In other application scenarios, the form generation options may include displaying a second form generation option in setting items of the first form. Please refer to FIG. 2B, which shows another schematic scene for generating the second form generation instructions. As shown in FIG. 2B, the above display page may further include the setting item 220 of the first form. The setting item 220 of the above first form may include but are not limited to: set a field, filter, sort, group, and other setting items. The above setting items may further include the second form generation selection item 221 (as shown in FIG. 2A, the second form generation selection item is displayed as "collect a form"). The user can issue instructions to generate the second form by triggering the second form generation option 221.

The above initial second form may include a plurality of cells to be filled. The cells to be filled can correspond to initial field that have no practical significance. The above initial field can be displayed as "AA", "BB", etc. The AA and BB herein can be arbitrary identifiers that have no practical significance, etc.

The field selection item can be displayed in the above display page. Each field selection item can indicate a second field. The second field is associated with the first field in the first form. In some application scenarios, each second field can be unidirectionally associated with the first field corresponding to the second field.

The User can determine the target second field through the selection operation of the field selection item. The target second field can be a field displayed in the second form.

The number of the above target second field may be more than one.

The method for form generation provided in the embodiment is realized by in response to receiving a generation instruction for a second form in a display page of a first form, displaying an initial second form and a field selection item, a second field indicated by the field selection item being associated with a first field in the first form; and determining a target second field based on a selection operation on the field selection item and generating a second form based on the target second field, realizing the generation of the second form based on the field of the first form, and since respective field of the generated second form is associated with the field of the first form, enabling the data collected by the second form can be automatically synchronized to the first form. The operation of synchronizing the collected data to the first form (database) is simplified, and the maintenance cost of the database is saved.

In some application scenarios, if the actor of the above method for form generation is a computer terminal such as a desktop computer, a notebook, the above field selection item can be displayed in the display window of the first form. The above field selection item can be located on one side of the above first form or embedded in the first form.

In some optional implementations, the above field selection item may be displayed in the display window of the first form, the above step 102 includes: generating the second form by adding the target second field to the initial second form based on a drag operation performed by a user on the target second field in the field selection item.

In these optional implementations, the target second field can be directly dragged into the second form by the above drag operation. Optionally, the above target second field can replace the content of the initial field. For example, if the original initial field is "AA" and the dragged target second field is "store", then "store" can directly replace the initial field "AA".

In these optional implementations, the target second field is directly dragged into the second form by dragging, so that each the target second field can be directly dragged into the respective corresponding initial field, thereby simplifying the operation of replacing the initial field with the target second field.

In some optional implementations, the above method for form generation further comprises the step as: removing the to-be-removed target second field from the second form based on a second predetermined operation performed on a to-be-removed target second field in the second form.

Optionally, the above second predetermined operation may include: a drag operation for dragging the target second field out of the second form.

In these optional implementations, the to-be-removed target second field may be directly dragged out of the second form, thereby removing the aforementioned to-be-removed target second field from the second form.

Optionally, the above second predetermined operation may include: a selection operation to be performed on a removing option for indicating removing the to-be-removed target second field.

In these optional implementations, the removing option for removing the target second field can also be set in the second form. In an implementation, each of the above target second fields can correspond to a removing option. That is, the removing option can be set around each target second field. The user can click the moving option corresponding to the target second field, so as to perform the second predetermined operation of moving the target second field out of the second form.

As another implementation, the above second form may be provided a removing option. After the user can select the target second field to be removed out, and then triggered to the removing option, so that the to-be-removed target second field is moved out of the second form.

Through the above second predetermined operation, the to-be-removed target second field out of the second form, which can improve the convenience of adjusting the content of the second form.

In some other application scenarios, if the actor of the above method for form generation is a mobile terminal, the field configuration item can be displayed at the top of the initial second form. The field configuration item can include a field selection item. One field selection item can correspond to a second field. That is to say, when the actor is a mobile terminal, the field configuration item can be displayed at the top of the initial second form.

In these application scenarios, the above step 102 may include: displaying a field configuration page based on a trigger operation performed by a user on the field configuration item, the field configuration page comprising the field selection item; and in response to receiving the selection operation performed on the field selection item, determining the target second field.

When the user triggers the field configuration item, the above field configuration item can be displayed on the page of the initial second form in the form of a floating window or a pop-up window. It can also cover the page of the initial second form.

The above field selection item may include at least one second field. The user may perform a selection operation on the field selection item, so as to determine the target second field.

In these application scenarios, the field configuration item is set at the top of the initial second form, so that the second form can be generated or edited in the mobile terminal.

In some optional implementations, the field configuration item further comprises a switch control corresponding to the at least one second field selection item. The in response to receiving the selection operation performed on the field selection item, determining the target second field comprises: in response to receiving an opening operation performed on a switch control corresponding to at least one candidate second field, determining the at least one candidate second field as the target second field.

In some optional implementations, the above second form may include at least one target second field. The top of the second form page displays field configuration item. The above method for form generation further includes by as:

First, receiving, in the second form page, a selection operation performed by a user on the field configuration item, a target second field displayed in the second form, and a switch control corresponding to the target second field;

Next, receiving a closing operation performed by a user on the switch control of the target second field to be removed, and removing a to-be-removed target second field from the second form.

Figure 2C:
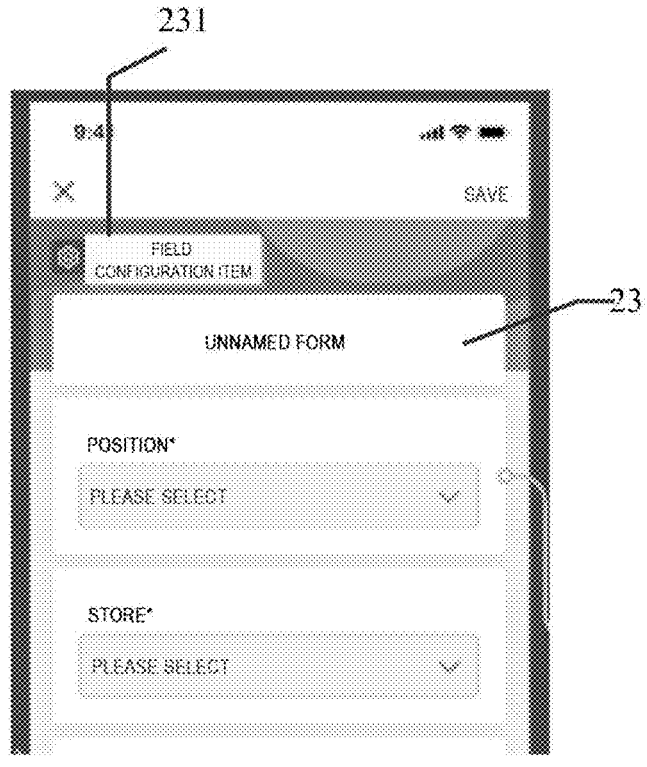
FIGS. 2C to 2D, are schematic scene diagrams illustrating operation performed on a second form in a mobile terminal.
Figure 2D:
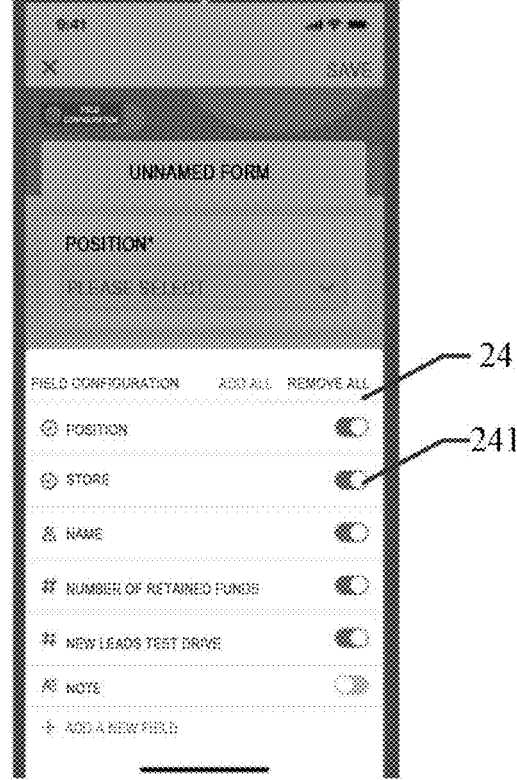

Reference is made to FIGS. 2C to 2D, which show schematic scene diagrams of the operation of the second form in the mobile terminal. In the mobile terminal, the page 23 of the initial second form can be displayed by setting the predetermined operation to be performed in the display page of the first form by setting the form generation option set at the top of the display page. The top of the initial second form can provide with a field configuration item 231. The user can trigger the display of the field configuration page 24 by performing a selection operation on the above field configuration item 231. The field configuration page may include a field selection item, such as the field selection item "position", "store", "name", "number of retained funds" etc., shown in FIG. 2D. The user can perform a selection operation on the field selection item in the above field configuration page to determine the target second field in the second form. In the field configuration page, each field selection item can be regarded as a candidate second field. Optionally, the above field configuration page further includes a switch control 241 corresponding to the field selection item. The user can determine the candidate second field as the target second field by performing an opening operation on the switch control corresponding to the candidate second field.

After the second form is generated, if one wants to delete one or several target second fields in the second form are desired to be deleted, a field configuration page 24 may also be triggered by performing a select operation on a field configuration item 231 displayed at the top of the page 23 of the second form. The field configuration page 24 may display respective target second field and the switch control 241 respective corresponding to target second field. The target second field is performed closing by the switch control. After the operation of the target second field is performed, the target second field may be removed from the second form.

In some optional implementations, the above method for form generation comprises: in response to receiving an adjustment operation for a displaying order of the target second field in the second form, adjusting displaying orders of respective target second fields in the second form.

After the second form is generated, the order of respective target second field in the second form may be adjusted in the second form by the above adjustment operation in the second form.

The above adjustment operation comprises a forward or backward drag operation performed on the target second field; or a trigger operation performed on a forward control or backward control corresponding to the target second field.

As an implementation, the above adjustment operation can be a forward or backward drag operation performed on the target second field. In this implementation, the target second field can be moved forward or backward by dragging the target second field in the second form. It can be understood that the drag operation herein can move the dragged target second field forward or backward by one or several display positions. In this implementation, it can greatly facilitate the editing operation of the second form by users.

As another implementation, the above adjustment operation can be a trigger operation performed on a forward control or backward control corresponding to the target second field.

In some optional implementations, respective target second field can be displayed in the second form. Respective target second field can correspond to forward control and backward control. The user can perform a trigger operation on the forward control or backward control corresponding to the target second field based on the position to which the target second field is to be moved. For example, if a target field "CC" is expected to move forwards to two positions, the target second field can be moved forward by one display position by triggering the forward control corresponding to the target second field, and then the target second field is moved forward by one display position by triggering the forward control corresponding to the target second field. The display position herein is used to display a target second field in the second form.

In some optional implementations, the above method for generating the form further comprises: determining an attribute of the target second field based on a predetermined operation performed by a user on an attribute setting item of the target second field. The attribute comprises mandatory or optional.

As one implementation, an attribute setting item can be set in the second form. The user can set the attribute of respective target second field through this attribute setting item. As another implementation, the above attribute setting items can be set at the display positions corresponding to respective target second field.

As a schematic illustration, the attribute setting item can include two types: mandatory and optional. For each target second field, the user can set the attribute of the target second field as mandatory or optional.

As another schematic illustration, the default attribute of respective target second field can be mandatory. The user can change the attribute of the target second field through the above attribute setting item.

In these optional implementations, the user is given the flexibly to set the attribute of the target second field by providing an entrance for setting the attribute of the target second field.

In some optional implementations, the above method for form generation further comprises: modifying field information of the target second field based on a modification operation of a user. The field information herein includes the field name.

With the above modification operation, the user can modify the field information of the target second field, thereby adjusting the display information of the second form.

In some optional implementations of the embodiment, the above method for form generation further comprises: receiving target data inputted by a user to the second form.

In these optional implementations, after generating the above second form, the user can directly fill in the target data corresponding to the target second field in the second form.

Further optionally, the above method for form generation further comprises synchronizing the target data to the first form.

After the user fills in the target data corresponding to the target second field in the second form, operation such as click Save or Submit can be performed. Through the above Save or Submit operation, the target data can be directly synchronized to the first form.

That is, the target data filled in the second form by the user may be synchronized to the first form.

Since target second field in the second form is associated with the corresponding first field in the first form respectively, the target data filled out in the second form corresponding to each target second field is synchronized to the data corresponding to the first field. As an implementation, if the user completes filling out a second form, a row of data records corresponding to the second form can be added to the first form.

In some optional implementations, the above method for form generation further comprises: generating a link of the second form; and transmitting the link to a shared user.

In these optional implementations, after the second form is generated, a link of the second form can be generated to send the above link to the sharing user. The sharing user can be a pre-specified user or an unspecified user. The user who receives the above sharing link can open the above second form through the above link. In some application scenarios, before the user opens the above second form through the above link, authentication needs to be performed. The user who passes the authentication can open the above second form through the above link. Otherwise, the above second form cannot be opened.

By opening the sharing user of the second form through the above link, the target data can be filled in the second form. After the target data is filled, the user can trigger options such as submit or upload, thereby the second form filled with the target data is transmitted back to the server corresponding to the first form. Since respective target second field in the second form corresponds one-to-one with a first field in the first form, the server can synchronize the target data in the second form to the first form after receiving the second form filled with the target data.

Reference is made to FIG. 3, which shows a flowchart of an embodiment of the method for form data processing provided by the present disclosure. As shown in FIG. 3, the method for form data processing includes by as:

Step 301, displaying a second form based on a received predetermined trigger operation performed on information of a second form to be shared, wherein the second form is generated by: in response to receiving a generation instruction for a second form in a display page of a first form, displaying an initial second form and a field selection item, a second field indicated by the field selection item being associated with a first field in the first form; and determining a target second field based on a selection operation on the field selection item and generating a second form based on the target second field.

Step 302, receiving target data inputted by a user to the second form.

Step 303, transmitting the target data to synchronize the target data to the first form.

In the present embodiment, the execution body of the above method for form data processing may be a terminal used by a sharing user receiving sharing link.

The above to-be-shared information of the second form, for example, information used to open or access the second form.

In some optional implementations, the above to-be-shared information of the second form may be a shared link for accessing the second form.

Through the above sharing link, the actor accesses or downloads the second form, and displays the second form to the sharing user. The sharing user can fill the target data in the above second form.

The above second form can be generated by as: in response to receiving a generation instruction for a second form in a display page of a first form, displaying an initial second form and a field selection item, a second field indicated by the field selection item being associated with a first field in the first form; and determining a target second field based on a selection operation on the field selection item and generating a second form based on the target second field. That is, the second form can be generated by the method provided in the embodiment shown in FIG. 1, which is not repeated herein.

The sharing user can input target data in the second form. The actor can receive the target data input by the user. Then, the actor can upload the second form with the target data input to the server that stores the first form data through the network. After receiving the target data, the server can synchronize the target data to the first form.

The method for form data processing provided in the embodiment displays the second form based on the received predetermined triggering operation performed by the information of the to-be-shared second form; the target data input by the user in the second form is received; and the target data is sent, so that the target data is synchronized to the first form, and since the fields of the generated second form are associated with the fields of the first form, the data collected by the second form can be automatically synchronized to the first form. The operation of synchronizing the collected data to the first form (database) is simplified, saving database maintenance costs.

Referring further to FIG. 4, as an implementation of the methods shown in the above figures, the present disclosure provides an embodiment of an apparatus for form generation, which corresponds to the method embodiment shown in FIG. 1 and can be specifically applied to various electronic devices.

As shown in FIG. 4, the apparatus for form generating of the present embodiment comprises: a display unit 401 and generation unit 402, wherein the display unit 401 is configured to in response to receiving a generation instruction for a second form in a display page of a first form, display an initial second form and a field selection item, a second field indicated by the field selection item being associated with a first field in the first form; and the generation unit 402 is configured to determine a target second field based on a selection operation on the field selection item and generate a second form based on the target second field.

In the present embodiment, the specific processing of the display unit 401 and the generation unit 402 of the apparatus for form generation and the technical effects thereof can be referred to the relevant descriptions of step 101 and step 102 in the corresponding embodiment of FIG. 1, respectively, and will not be repeated herein.

In some optional implementations, the receiving a generation instruction for a second form in a display page of a first form comprises: receiving a predetermined operation performed on a form generation option displayed in the display page of the first form.

In some optional implementations, displaying a first form generation option in a view generation tool in the display page; and/or displaying a second form generation option in setting items of the first form.

In some optional implementations, the field selection item is displayed in a display window of the first form or displayed at the top of a page of the initial second form.

In some optional implementations, the field selection item is displayed in a display window of the first form, and the generation unit 402 is further configured to generate the second form by adding the target second field to the initial second form based on a drag operation performed by a user on the target second field in the field selection item.

In some optional implementations, the generation unit 402 is further configured to remove the to-be-removed target second field from the second form based on a second predetermined operation performed on a to-be-removed target second field in the second form.

In some optional implementations, the second predetermined operation comprises: a drag operation for dragging the target second field out of the second form; or a selection operation to be performed on a removing option for indicating removing the to-be-removed target second field.

In some optional implementations, the field configuration item is displayed on the top of a page of the initial second form; and a generation unit 402 is further configured to display a field configuration page based on a trigger operation performed by a user on the field configuration item, the field configuration page comprises the field selection item; and in response to receiving the selection operation performed on the field selection item, determining the target second field.

In some optional implementations, the field configuration page further comprises a switch control corresponding to at least one field selection item; and a generation unit 402 is further configured to in response to receiving an opening operation performed on a switch control corresponding to at least one candidate second field, determining the at least one candidate second field as the target second field.

In some optional implementations, the field configuration item is displayed on the top of the page of the second form; the field configuration item further comprises a switch control corresponding to the at least one second field selection item; and a generation unit 402 is further configured to receive, in the second form page, a selection operation performed by a user on the field configuration item, a target second field displayed in the second form, and a switch control corresponding to the target second field; and receiving a closing operation performed by a user on the switch control of the target second field to be removed, and removing a to-be-removed target second field from the second form.

In some optional implementations, the generation unit 402 is further configured to in response to receiving an adjustment operation for a displaying order of the target second field in the second form, adjusting displaying orders of respective target second fields in the second form.

In some optional implementations, the adjustment operation comprises: a forward or backward drag operation performed on the target second field; or a trigger operation performed on a forward control or backward control corresponding to the target second field.

In some optional implementations, the generation unit 402 is further configured to determine an attribute of the target second field based on a predetermined operation performed by a user on an attribute setting item of the target second field. The attribute comprises mandatory or optional.

In some optional implementations, the generation unit 402 is further configured to modify field information of the target second field based on a modification operation of a user.

In some optional implementations, the form generating means further comprises a data processing unit (not shown), a data processing unit configured to receive target data inputted by a user to the second form.

In some optional implementations, the data processing unit is further configured to synchronize the target data to the first form.

In some optional implementations, the data processing unit is further configured to generate a link of the second form; and transmitting the link to a shared user.

Figure 5:
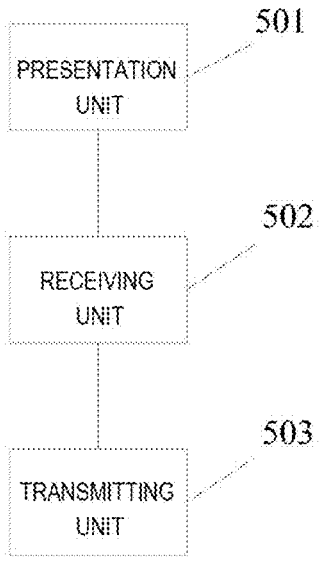
FIG. 5 is a schematic structural diagram of an embodiment of an apparatus for form data processing according to the present disclosure.

Referring further to FIG. 5, as an implementation of the method shown in the above figures, the present disclosure provides an embodiment of an apparatus for form data processing, which corresponds to the method embodiment shown in FIG. 3 and can be specifically applied to various electronic devices.

As shown in FIG. 5, the apparatus for form data processing of the present embodiment comprises: a presentation unit 501, a receiving unit 502 and a transmitting unit 503. Wherein the presentation unit 501 configured to display a second form based on a received predetermined trigger operation performed on information of a second form to be shared, wherein the second form is generated by: in response to receiving a generation instruction for a second form in a display page of a first form, displaying an initial second form and a field selection item, a second field indicated by the field selection item being associated with a first field in the first form; and determining a target second field based on a selection operation on the field selection item and generating a second form based on the target second field; the receiving unit 502 configured to receive target data inputted by a user to the second form; the transmitting unit 503 configured to transmit the target data to synchronize the target data to the first form.

In the present embodiment, the specific processing of the presentation unit 501, the receiving unit 502 and the transmitting unit 503 of the apparatus for form data processing and the technical effects thereof can be referred to steps 301, 302 and 302 in the corresponding embodiment of FIG. 3, respectively, relevant instructions will not be repeated herein.

In some optional implementations, the information of the second form to be shared comprises a link for accessing the second form.

Figure 6:
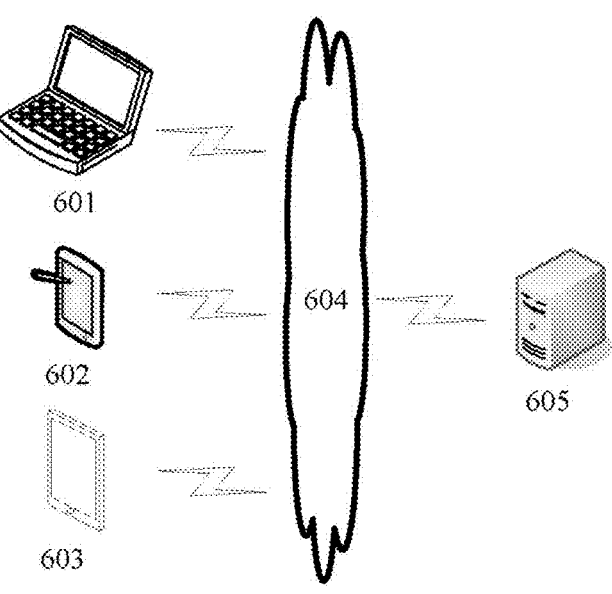
FIG. 6 is an exemplary system architecture in which a method for form generation or a method for form data processing of an embodiment of the present disclosure can be applied.

Please refer to FIG. 6, which shows an exemplary system architecture to which a method for form generation or method for form data processing of an embodiment of the present disclosure may be applied.

As shown in FIG. 6, the system architecture may include terminal devices 601, 602, 603, a network 604, and a server 605. The network 604 is used to provide media of communication links between the terminal devices 601, 602, 603 and the server 605. The network 604 may include various connection types, such as wired, wireless communication links, or fiber optic cables.

The terminals 601, 602, and 603 may interact with the server 605 through the network 604 to receive or send messages, etc. On the terminal devices 601, 602, 603 may be installed a variety of client applications, such as web browser applications, search applications, news and information applications. The client application in the terminals 601, 602, and 603 may receive user instructions and perform corresponding functions according to the user instructions, such as a page is opened based on the instruction of the user.

The terminal devices 601, 602, 603 may be hardware or software. When the terminal devices 601, 602, 603 are hardware, they may be various electronic devices with a display screen and supporting web browsing, including but not limited to, smart phones, tablet computers, e-book readers, MP3 (Moving Picture Experts Group Audio Layer III) players, MP4 (Moving Picture Experts Group Audio Layer IV) players, laptop computers and desktop computers, etc. When the terminal devices 601, 602, 603 are software, they may be installed in the above listed electronic devices, and may be implemented as multiple software or software modules (such as software or software modules for providing distributed services) or as a single software or software module. It is not intended to limit in this regard.

The server 605 may be a server that provides various services, such as receiving information display request sent by the terminal devices 601, 602, 603 and displaying information based on the information display request. The related data of the display information is sent to the terminal devices 601, 602, 603.

It should be noted that the method for form generation or method for form data processing provided in the embodiments of the present disclosure may be executed by the terminal devices, and correspondingly, the apparatus for form generation or apparatus for form data processing may be arranged in the terminal devices 601, 602, 603.

It should be understood that the number of terminal devices, networks, and servers shown in FIG. 6 is only schematic. Depending on practical needs, any number of terminal devices, networks, and servers may be provided.

Figure 7:
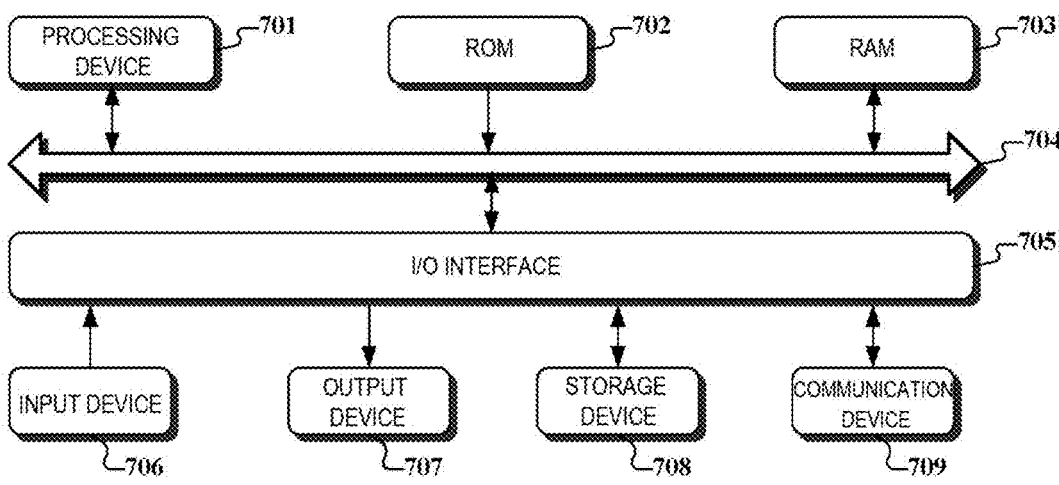
FIG. 7 is a schematic diagram of a basic structure of an electronic device provided in accordance according to an embodiment of the present disclosure.

Reference is made to FIG. 7 below, which shows a structural schematic diagram of an electronic device suitable for implementing the embodiments of the present disclosure. The electronic device here generally refers to a terminal or server (e.g., the terminal devices or server in FIG. 6) in hardware form. The terminal devices in the embodiments of the present disclosure may include, without limitation to, a mobile terminal such as a mobile phone, a laptop computer, a digital broadcast receiver, a PDA (personal digital assistant), a PAD (tablet computer), a PMP (portable multimedia player), an on-board terminal (e.g., on-board navigation terminal) and the like, as well as a fixed terminal such as a digital TV, a desktop computer and the like. The electronic device shown in FIG. 7 is merely an example and should not be construed to impose any limitations on the functionality and use scope of the embodiments of the present disclosure.

As shown in FIG. 7, the electronic device may comprise processing device (e.g., a central processor, a graphics processor) 701 which is capable of performing various appropriate actions and processes in accordance with programs stored in a read only memory (ROM) 702 or programs loaded from storage device 708 to a random access memory (RAM) 703. In the RAM 703, there are also stored various programs and data required by the electronic device 600 when operating. The processing device 701, the ROM 702 and the RAM 703 are connected to one another via a bus 704. An input/output (I/O) interface 705 is also connected to the bus 704.

Usually, the following means may be connected to the I/O interface 705: input device 706 including a touch screen, a touch pad, a keyboard, a mouse, a camera, a microphone, an accelerometers, a gyroscope, or the like; output device 707, such as a liquid-crystal display (LCD), a loudspeaker, a vibrator, or the like; storage device 708, such as a magnetic tape, a hard disk or the like; and communication device 709. The communication device 709 allows the electronic device 600 to perform wireless or wired communication with other device so as to exchange data with other device. While FIG. 7 shows the electronic device 600 with various means, it should be understood that it is not required to implement or have all of the illustrated means. Alternatively, more or less means may be implemented or exist.

Specifically, according to the embodiments of the present disclosure, the procedures described with reference to the flowchart may be implemented as computer software programs. For example, the embodiments of the present disclosure comprises a computer program product that comprises a computer program embodied on a non-transitory computer-readable medium, the computer program including program codes for executing the method shown in the flowchart. In such an embodiment, the computer program may be loaded and installed from a network via the communication device 709, or installed from the storage device

708, or installed from the ROM 702. The computer program, when executed by the processing device 701, perform the above functions defined in the method of the embodiments of the present disclosure.

It is noteworthy that the computer readable medium of the present disclosure can be a computer readable signal medium, a computer readable storage medium or any combination thereof. The computer readable storage medium may be, for example, but is not limited to, an electronic, magnetic, optical, electromagnetic, infrared or semiconductor system, apparatus or device, or any combination of the foregoing. More specific examples of the computer readable storage medium may include, without limitation to, the following: an electrical connection with one or more conductors, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer readable storage medium may be any tangible medium including or storing a program that may be used by or in conjunction with an instruction executing system, apparatus or device. In the present disclosure, the computer readable signal medium may include data signals propagated in the baseband or as part of the carrier waveform, in which computer readable program code is carried. Such propagated data signals may take a variety of forms, including without limitation to electromagnetic signals, optical signals, or any suitable combination of the foregoing. The computer readable signal medium may also be any computer readable medium other than a computer readable storage medium that may send, propagate, or transmit a program for use by, or in conjunction with, an instruction executing system, apparatus, or device. The program code contained on the computer readable medium may be transmitted by any suitable medium, including, but not limited to, a wire, a fiber optic cable, RF (radio frequency), etc., or any suitable combination thereof.

In some implementations, the client and server may communicate utilizing any currently known or future developed network protocol such as HTTP (Hypertext Transfer Protocol) and may be interconnected with digital data communications (e.g., communication networks) of any form or medium. Examples of communication networks include local area networks ("LANs"), wide area networks ("WANs"), inter-networks (e.g., the Internet), and end-to-end networks (e.g., ad hoc end-to-end networks), as well as any currently known or future developed networks.

The above computer readable medium may be contained in the above electronic device; or it may exist separately and not be assembled into the electronic device.

The above computer readable medium carries one or more programs which, when executed by the electronic device, cause the electronic device to: in response to receiving a generation instruction for a second form in a display page of a first form, displaying an initial second form and a field selection item, a second field indicated by the field selection item being associated with a first field in the first form; and determining a target second field based on a selection operation on the field selection item and generating a second form based on the target second field. or Displaying a second form based on a received predetermined trigger operation performed on information of a second form to be shared, wherein the second form is generated by: in response to receiving a generation instruction for a second form in a display page of a first form, displaying an initial second form and a field selection item, a second field indicated by the field selection item being associated with a first field in the first form; and determining a target second field based on a selection operation on the field selection item and generating a second form based on the target second field; receiving target data inputted by a user to the second form; and transmitting the target data to synchronize the target data to the first form.

Computer program code for carrying out operations of the present disclosure may be written in one or more program designing languages or a combination thereof, which include without limitation to an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some optional implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Units involved in the embodiments of the present disclosure as described may be implemented in software or hardware. The name of a unit does not form any limitation on the module itself.

The functionality described above may at least partly be performed, at least in part, by one or more hardware logic components. For example, and in a non-limiting sense, exemplary types of hardware logic components that can be used include: field-programmable gate arrays (FPGA), application specific integrated circuits (ASICs), application specific standard products (ASSPs), systems on chips (SOCs), complex programmable logic devices (CPLDs), etc.

In the context of the present disclosure, the machine readable medium may be a tangible medium that can retain and store programs for use by or in conjunction with an instruction execution system, apparatus or device. The machine readable medium of the present disclosure can be a machine readable signal medium or a machine readable storage medium. The machine readable medium may include, but is not limited to, an electronic, magnetic, optical, electromagnetic, infrared or semiconductor system, apparatus or device, or any combination of the foregoing. More specific examples of the machine readable storage medium may include, without limitation to, the following: an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

The foregoing description is merely illustration of the preferred embodiments of the present disclosure and the technical principles used herein. Those skilled in the art should understand that the disclosure scope involved therein is not limited to the technical solutions formed from a particular combination of the above technical features, but should also cover other technical solutions formed by any combination of the above technical features or their equivalent features without departing from the above disclosure concepts, e.g., technical solutions formed by replacing the above features with technical features having similar functions disclosed (without limitation) in the present disclosure.

In addition, although various operations have been depicted in a particular order, it should not be construed as requiring that the operations be performed in the p articular order shown or in sequential order of execution. Multitasking and parallel processing may be advantageous in certain environments. Likewise, although the foregoing discussion includes several specific implementation details, they should not be construed as limiting the scope of the present disclosure. Some features described in the context of separate embodiments may also be realized in combination in a single embodiment. On the contrary, various features described in the context of a single embodiment may also be realized in multiple embodiments, either individually or in any suitable sub-combinations.

While the present subject matter has been described using language specific to structural features and/or method logic actions, it should be understood that the subject matter defined in the appended claims is not necessarily limited to the particular features or actions described above. On the contrary, the particular features and actions described above are merely exemplary forms of realizing the claims. With respect to the apparatus in the above embodiment, the specific manner in which each module performs an operation has been described in detail in the embodiments relating to the method, and will not be detailed herein.

We claim:

1. A method for form generation, comprising:
in response to receiving a generation instruction for a second form in a display page of a first form, displaying an initial second form and a field selection item, a second field indicated by the field selection item being associated with a first field in the first form;
determining a target second field based on a selection operation on the field selection item and generating a second form based on the target second field,
wherein the method further comprises:
generating a link of the second form; and
transmitting the link to a shared user to allow the shared user to open the second form;
receiving target data inputted by the shared user into the target second field in the generated second form, the target data being data collected via the second form from the shared user; and
synchronizing the target data inputted by the shared user into the target second field to the first field in the first form, wherein the target second field is associated with the first field in the first form in a one-to-one correspondence, and the synchronization comprises updating the first field based on the collected target data.

2. The method of claim 1, wherein the receiving a generation instruction for a second form in a display page of a first form comprises:

receiving a predetermined operation performed on a form generation option displayed in the display page of the first form.

3. The method of claim 2, wherein the form generation option comprises:

displaying a first form generation option in a view generation tool in the display page; and/or displaying a second form generation option in setting items of the first form.

4. The method of claim 1, wherein the field selection item is displayed in a display window of the first form, or displayed at a top of a page of the initial second form.

5. The method of claim 1, wherein the field selection item is displayed in a display window of the first form, and the determining a target second field based on a selection operation on the field selection item and generating a second form based on the target second field comprises:

generating the second form by adding the target second field to the initial second form based on a drag operation performed by a user on the target second field in the field selection item.

6. The method of claim 1, wherein the method further comprises:

removing a to-be-removed target second field from the second form based on a second predetermined operation performed on the to-be-removed target second field in the second form.

7. The method of claim 6, wherein the second predetermined operation comprises:

a drag operation for dragging the target second field out of the second form; or a selection operation to be performed on a removing option for indicating removing the to-be-removed target second field.

8. The method of claim 1, wherein a field configuration item is displayed on a top of a page of the initial second form; and the determining a target second field based on a selection operation on the field selection item and generating a second form based on the target second field comprises:

displaying a field configuration page based on a trigger operation performed by a user on the field configuration item, the field configuration page comprising the field selection item; and in response to receiving the selection operation performed on the field selection item, determining the target second field.

9. The method of claim 8, wherein the field configuration page further comprises a switch control corresponding to at least one field selection item; and the determining the target second field based on the received selection operation performed on the field selection item comprises:

in response to receiving an opening operation performed on a switch control corresponding to at least one candidate second field, determining the at least one candidate second field as the target second field.

10. The method of claim 8, wherein the field configuration item is displayed on the top of the page of the second form;

the field configuration item further comprises a switch control corresponding to the at least one second field selection item; and the method further comprises:

receiving, in the second form page, a selection operation performed by a user on the field configuration item, a target second field displayed in the second form, and a switch control corresponding to the target second field; and receiving a closing operation performed by a user on the switch control of a to-be-removed target second field, and removing a to-be-removed target second field from the second form.

11. The method of claim 1, wherein the method further comprises:

in response to receiving an adjustment operation for a displaying order of the target second field in the second form, adjusting displaying orders of respective target second fields in the second form.

12. The method of claim 11, wherein the adjustment operation comprises:

a forward or backward drag operation performed on the target second field; or a trigger operation performed on a forward control or backward control corresponding to the target second field.

13. The method of claim 1, wherein the method further comprises:

determining an attribute of the target second field based on a predetermined operation performed by a user on an attribute setting item of the target second field; the attribute comprising mandatory or optional.

14. The method of claim 1, wherein the method further comprises:

modifying field information of the target second field based on a modification operation of a user.

15. A method for form data processing, comprising, displaying a second form based on a received predetermined trigger operation performed on information of a second form to be shared, wherein the second form is generated by: in response to receiving a generation instruction for a second form in a display page of a first form, displaying an initial second form and a field selection item, a second field indicated by the field selection item being associated with a first field in the first form; and determining a target second field based on a selection operation on the field selection item and generating a second form based on the target second field;

generating a link of the second form; and transmitting the link to a shared user to allow the shared user to open the second form;

receiving target data inputted by the shared user into the target second field in the generated second form, the target data being data collected via the second form from the shared user; and synchronizing the target data inputted by the shared user into the target second field to the first field in the first form, wherein the target second field is associated with the first field in the first form in a one-to-one correspondence, and the synchronization comprises updating the first field based on the collected target data.

16. An electronic device, comprising:

one or more processors; and a storage for storing one or more programs, the one or more programs, when executed by the one or more processors, causing the one or more processors to implement a method, the method comprising:

in response to receiving a generation instruction for a second form in a display page of a first form, displaying an initial second form and a field selection item, a second field indicated by the field selection item being associated with a first field in the first form;

determining a target second field based on a selection operation on the field selection item and generating a second form based on the target second field, wherein the method further comprises:

generating a link of the second form; and transmitting the link to a shared user to allow the shared user to open the second form;

receiving target data inputted by the shared user into the target second field in the generated second form, the target data being data collected via the second form from the shared user; and synchronizing the target data inputted by the shared user into the target second field to the first field in the first form, wherein the target second field is associated with the first field in the first form in a one-to-one correspondence, and the synchronization comprises updating the first field based on the collected target data.

\* \* \* \* \*